United States Patent
Snyder

(10) Patent No.: US 6,452,772 B1
(45) Date of Patent: Sep. 17, 2002

(54) AUTO REMOTE CONTROL WITH SIGNAL STRENGTH DISCRIMINATION

(75) Inventor: Douglas D. Snyder, Bergholz, OH (US)

(73) Assignee: Jon Snyder, Inc., Wintersville, OH (US)

( * ) Notice: Subject to any disclaimer, the term of this patent is extended or adjusted under 35 U.S.C. 154(b) by 0 days.

(21) Appl. No.: 09/382,133

(22) Filed: Aug. 24, 1999

Related U.S. Application Data

(60) Provisional application No. 60/097,821, filed on Aug. 25, 1998.

(51) Int. Cl.[7] .................................................. H02H 3/00
(52) U.S. Cl. ..................... 361/93.9; 307/10.1; 340/650; 361/93.1
(58) Field of Search .............................. 361/93.1, 93.9, 361/84, 58, 100, 111, 82, 91.2; 307/10.1, 52, 62, 33, 35, 10.7; 340/649, 650

(56) References Cited

U.S. PATENT DOCUMENTS

| | | | |
|---|---|---|---|
| 4,471,400 A | * | 9/1984 | Reza ............................ 361/88 |
| 4,631,623 A | * | 12/1986 | Gohl ............................ 361/86 |
| 5,391,948 A | * | 2/1995 | Izumita ....................... 327/310 |
| 5,657,195 A | * | 8/1997 | Rault ........................... 361/86 |
| 6,144,539 A | * | 11/2000 | Konopka et al. ........... 361/93.1 |

* cited by examiner

*Primary Examiner*—Kim Huynh
(74) *Attorney, Agent, or Firm*—Wood, Herron & Evans, L.L.P.

(57) ABSTRACT

A current limiting resistor capable of dissipating power greater than about ¼ Watt is incorporated between the output circuitry of an aftermarket electrical system and an output terminal, so that the output circuitry is protected from excessive currents flowing through the output terminal as a consequence of incorrect connections being made to the output terminal. The resistor has a value of approximately forty Ohms, and a power dissipation rating of three Watts. When correct connections are made, the resistor will permit a current flow from the output terminal of approximately ninety milliAmps through a relay winding, which is sufficient to activate the relay. However, in the case of a miswiring, the resistor will limit the current flow through the output circuitry to no more than about 300 milliAmps.

6 Claims, 1 Drawing Sheet

AUTO REMOTE CONTROL WITH SIGNAL STRENGTH DISCRIMINATION

This application is a continuation of previously-filed provisional application Serial No. 60/097,821 filed Aug. 25, 1998, which is hereby incorporated by reference herein in its entirety.

FIELD OF THE INVENTION

The present invention relates to automobile aftermarket circuitry such as car alarms, door lock and starter control circuits.

BACKGROUND OF THE INVENTION

Consumers frequently seek to upgrade their vehicle by adding various electronic functions not included in the vehicle's original equipment. Often, consumers desire an aftermarket upgrade enhancing the electronic functionality of the vehicle, for example adding a car alarm, a door lock control system permitting remote control of door locks, and/or a starter control system permitting remote starting of the vehicle's engine. A large number of aftermarket systems are presently available to add these various functions to vehicles.

Aftermarket electrical systems typically include power and ground connections for connection to the vehicle's battery, either directly or through the ignition switch. The electrical system derives power from these power and ground connections, and uses this power to drive electrical components either directly or using relays. As one example, an aftermarket remote starter control can include a receiver for receiving radio signals indicating that the vehicle is to be started, and a current output for driving a relay wired in parallel with the vehicle's ignition switch for delivering current from the battery to the vehicle's starter.

Aftermarket electrical systems of this kind have proven to be difficult to install. Correct electrical connections must be made to the vehicle's battery and other electrical systems. Unfortunately, these connections are not always made correctly. In a surprisingly large percentage of cases, which can be as large as 35% of all installations, the connections from the aftermarket electrical system to the vehicle are made incorrectly, causing damage to the aftermarket electrical system. For example, the negative and positive connections from the aftermarket electrical system must be correctly wired to the vehicle's battery. If the vehicle's battery is mistakenly connected to an output lead, excessive current will flow through the aftermarket electrical system, destroying the output circuitry.

Accordingly, it is an object of the present invention to improve aftermarket electrical systems by incorporating protective components which will reduce the likelihood of damage when incorrect connections have been made to the electrical system.

SUMMARY OF THE INVENTION

In accordance with the present invention, this object is accomplished by incorporating, between output circuitry of an aftermarket electrical system and the output terminal, a current limiting circuit capable of dissipating power greater than about ¼ Watt. By incorporating such a current limiting circuit, the output circuitry is protected from excessive currents flowing through the output terminal as a consequence of incorrect connections being made to the output terminal.

In the specific embodiment described below, the current limiting circuit is a resistor, and the resistor has a value of approximately forty Ohms, and a power dissipation rating of three Watts. When the output terminal is connected to a typical relay winding and the output circuitry is energized, a resistor of this value and power rating will permit a current flow of approximately ninety milliAmps through the relay winding, which is sufficient to activate the relay. Thus, the resistor does not interfere with normal operation of the aftermarket electrical system when correctly connected. However, if the battery voltage is inadvertently connected directly to the output terminal, a resistor of this value will limit the current flow into the output circuit to no more than about 300 milliAmps, which is substantially less likely to damage the output circuitry than the much greater currents that would be generated in the absence of an output resistance.

The above and other objects and advantages of the present invention shall be made apparent from the accompanying drawings and the description thereof.

BRIEF DESCRIPTION OF THE DRAWINGS

The accompanying single FIGURE of drawing, which is incorporated in and constitutes a part of this specification, illustrates embodiments of the invention and, together with a general description of the invention given above, and the detailed description of the embodiments given below, serves to explain the principles of the invention. The FIGURE is an to illustration of an aftermarket electrical system in accordance with principles of the present invention.

DETAILED DESCRIPTION OF SPECIFIC EMBODIMENTS

Figure 1:
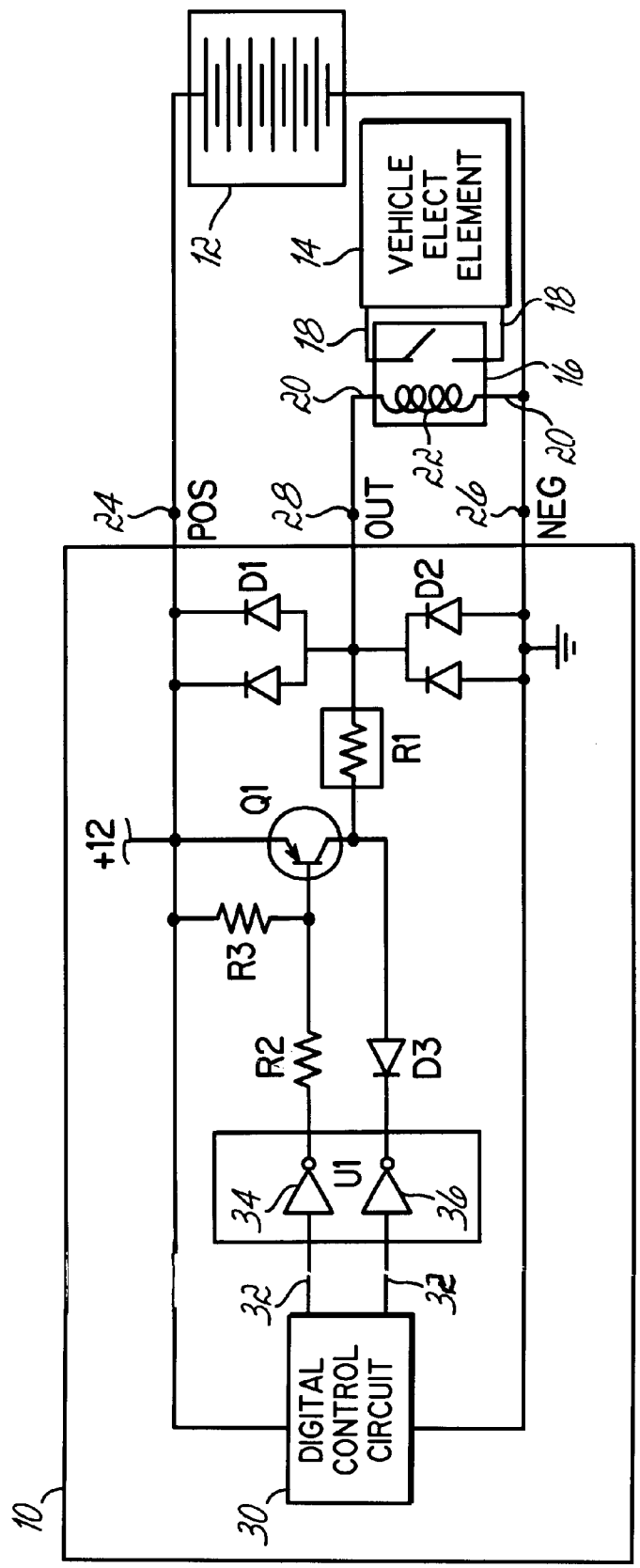

Referring now to the Figure, there is shown an aftermarket electrical system 10 for connection to the battery 12 and an electrical element 14 of a typical vehicle using a relay 16. For the sake of example, the output terminals 18 of relay 16 may be connected in parallel to the ignition switch of the vehicle such that when there is sufficient current flow through the input terminals 20-of the relay and the relay winding 22, the relay closes, causing power to be supplied to the vehicle's starter, starting the vehicle engine. Other electrical elements of the vehicle may also be connected to output terminals 18 of relay 16; for example, the power door locks, windows, or an alarm system may be controlled by the opening or closing of relay 16 in response to winding current through input terminals 20.

The electrical terminals of aftermarket electrical system 10 include a "POS" terminal 24 intended to be connected to the vehicle's battery, a "NEG" terminal 26 intended to be connected to a ground connection, and an "OUT" terminal 28 intended to be connected to an input terminal of a relay, with the opposite input terminal of the relay connected to ground. Aftermarket electrical system 10 will not operate correctly if these connections are made incorrectly.

Aftermarket electrical system 10 includes a digital control circuit 30 which generates control signals in response to detected conditions. For the sake of example only, digital control circuit 30 may include a radio frequency receiver for receiving radio frequency signals from a remote control (not shown), evaluating these signals and producing control signals in response to activate desired vehicle functions.

Digital control circuit 30 produces one or more control signals on one or more digital output connections. Two such connections 32 are shown in FIG. 1. Connections 32 lead to an output circuit including digital drivers 34 and 36 in an integrated circuit U1, which provide current controlling various analog output circuitry. This output circuitry includes a PNP transistor Q1 that provides current amplification. The emitter of transistor Q1 is connected to the POS terminal 24. The base of transistor Q1 is connected through base resistor R2 to an output driver 34 and through bias resistor R3 to the POS terminal 24. The collector of transistor Q1 is connected to output resistor R1 and to diode D3. The opposite terminal of diode D3 is connected to the output driver 36. The opposite terminal of output resistor R1 is connected to output terminal 28, and to diodes D1 and D2. The opposite terminals of diodes D1 and D2 are connected to the POS terminal 24 and NEG terminal 26, respectively.

Output resistor R1 has a value and power rating selected to permit sufficient current flow to relay winding 22 under normal wiring conditions, to activate the relay 16, but to prevent excessive input currents. Specifically, resistor R1 has a value of approximately forty Ohms, and a power dissipation rating of three Watts. When the output terminal is connected to a typical relay winding 22 and the output circuitry is energized by digital control circuit 30, a resistor of this value and power rating will permit a current flow of approximately ninety milliAmps through the relay winding 22, which is sufficient to activate the relay 16. Thus, the output resistor R1 does not interfere with normal operation of the aftermarket electrical system when correctly connected. However, if the battery 12 is inadvertently connected directly to the output terminal 28, or if the relay input terminal is inadvertently connected to the positive terminal of the battery instead of a ground connection, the output resistor R1 will limit the current flow into the output circuit to no more than about 300 milliAmps, which is substantially less likely to damage the other output circuitry than the much greater currents that would be generated in the absence of an output resistance.

The following table identifies components and, where applicable, component values, for the elements illustrated in FIG. 1.

| Component | Type/Value |
|---|---|
| R1 | Resistor, 39 Ω, 3 W |
| R2 | Resistor, 1.2 kΩ |
| R3 | Resistor, 1.2 kΩ |
| Q1 | PNP Transistor, 2N4403 |
| D1 | Diode, 1N4148 |
| D2 | Diode, 1N4148 |
| D3 | Diode, 1N4004 |
| U1 | Inverting driver, ULN2003 |

While the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. For example, output resistor R1 could be replaced with other current limiting circuitry which may or may not include one or more resistors as well as other electrical elements. The invention in its broader aspects is therefore not limited to the specific details, representative apparatus and method, and illustrative example shown and described. Accordingly, departures may be made from such details without departing from the spirit or scope of applicant's general inventive concept.

What is claimed is:

1. An aftermarket electrical system for installation to a vehicle including output protection, comprising
   a power terminal intended for connection to a source of electrical power from the vehicle,
   a ground terminal intended for connection to a ground in the vehicle,
   an output terminal for providing a switchably controlled current flow to an electrical element of the vehicle,
   control circuitry for determining when current flow is to be provided to the electrical element of the vehicle,
   output circuitry responsive to said control circuitry for providing said current flow, and
   a current limiting circuit electrically interposed between said output circuitry and said output terminal such that electrical current flow between said output terminal and said output circuitry passes through said current limiting circuit, said current limiting circuit dissipating power from said current flow between said output terminal and said output circuitry greater than about ¼ Watt,
   whereby said output circuitry is protected from excessive currents flowing through the output terminal as a consequence of incorrect electrical connections made to said output terminal.

2. The aftermarket electrical system of claim 1 wherein said current limiting circuit comprises a resistor.

3. The aftermarket electrical system of claim 2 wherein said resistor has a resistance of approximately forty Ohms.

4. The aftermarket electrical system of claim 2 wherein said resistor has a power dissipation rating of approximately three Watts.

5. The aftermarket electrical system of claim 1 wherein said current limiting circuit permits a current flow of approximately ninety milliAmps from said output circuitry through said output terminal when said output circuitry is activated and said output terminal is connected to a relay winding.

6. The aftermarket electrical system of claim 1 wherein said current limiting circuit limits current flow into said output circuitry to no more than about 300 milliAmps.

* * * * *